(12) United States Patent
Lathrop et al.

(10) Patent No.: US 11,331,866 B2
(45) Date of Patent: May 17, 2022

(54) FORMING MACHINE WITH ENHANCED SETUP AND HEALTH FEEDBACK

(71) Applicant: The Boeing Company, Chicago, IL (US)

(72) Inventors: Mathew K. Lathrop, Orting, WA (US); Daniel J. Wade, Carbonado, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 16/544,752

(22) Filed: Aug. 19, 2019

(65) Prior Publication Data

US 2021/0053302 A1 Feb. 25, 2021

(51) Int. Cl.
| | | |
|---|---|---|
| *B32B 41/00* | (2006.01) | |
| *B29C 70/54* | (2006.01) | |
| *B29C 70/30* | (2006.01) | |
| *B29L 31/30* | (2006.01) | |
| *B29K 307/04* | (2006.01) | |

(52) U.S. Cl.
CPC .............. *B29C 70/54* (2013.01); *B29C 70/30* (2013.01); *B29K 2307/04* (2013.01); *B29K 2905/00* (2013.01); *B29L 2031/3076* (2013.01)

(58) Field of Classification Search
CPC ....... B29C 70/54; B29C 70/30; B29C 70/462; B29K 2307/04; B29K 2905/00; B29L 2031/3076; B21D 22/205; B21D 22/22; B29D 99/0003

USPC ..................... 156/60, 64, 350, 351, 378, 379
See application file for complete search history.

(56) References Cited

U.S. PATENT DOCUMENTS

2015/0004347 A1* 1/2015 Kline ...................... B29C 65/26
428/58

* cited by examiner

*Primary Examiner* — Michael N Orlando
*Assistant Examiner* — Joshel Rivera
(74) *Attorney, Agent, or Firm* — Duft & Bornsen, PC

(57) ABSTRACT

Systems and methods for forming machine with enhanced setup and health feedback. One embodiment is a forming machine including a positioning system to move a forming member and mandrel relative to one another for forming a shaped part, and a sensor disposed between the forming member and the mandrel. A forming controller obtains a first coordinate position of the forming member and the mandrel in position to produce a target baseline parameter at the sensor prior to placement of a part over the mandrel. The forming controller calculates a second coordinate position of the forming member and the mandrel for forming the part based on the first coordinate position and a thickness of the part. After placement of the part over the mandrel, the forming controller directs the positioning system to move the forming member and the mandrel to the second coordinate position to shape the part.

23 Claims, 8 Drawing Sheets

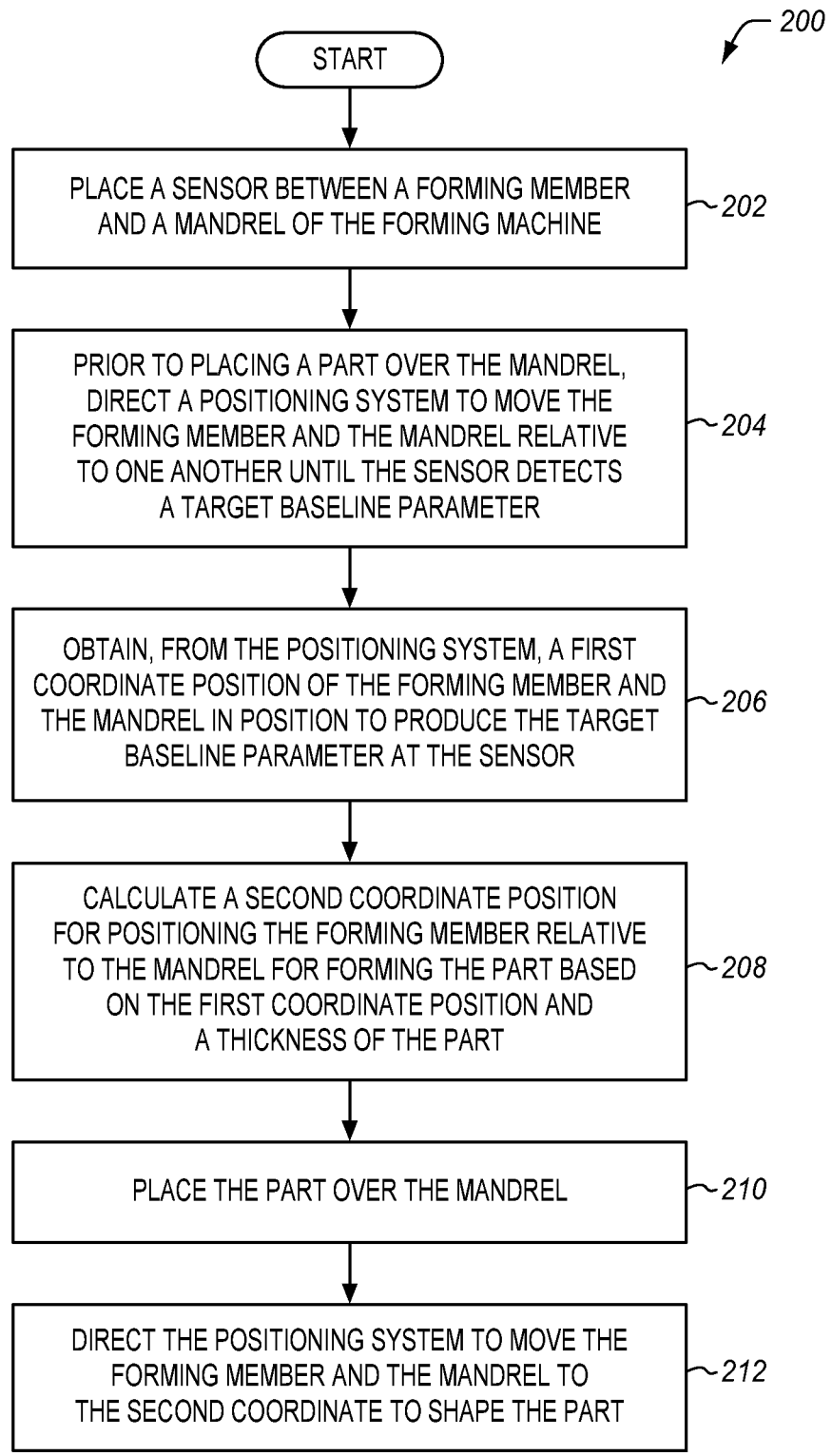

FORMING MACHINE WITH ENHANCED SETUP AND HEALTH FEEDBACK

FIELD

The disclosure relates to forming tools including a laminate shear forming machine to shape composite parts.

BACKGROUND

Forming machines, such as laminate shear forming machines, are useful in modern aerospace applications for forming large composite parts such as aircraft spars. As opposed to a manual layup process in which layers of carbon fiber pre-preg materials are laid up and compacted into shape layer by layer, laminate shear forming machines use heat and pressure to rapidly contour and consolidate the layers of material into the desired shape for the part. To help ensure that a part is formed correctly, the laminate shear forming machine undergoes an initial setup process.

Typically, setup processes involve highly-trained personnel climbing into the forming machine to manually establish reference points, measuring offset within the machine using a dial gage, and interpreting results of the dial gage as an inferred degree of forming force. Forming trials are then performed which typically evolve incrementally through several iterations of trial and error to establish an acceptable level of forming results. Unfortunately, the forming trials are costly in terms of time and materials, and the dial gage setup process usually must be repeated as machine performance adjusts over time.

SUMMARY

Embodiments described herein provide a forming machine with enhanced setup and health feedback. A forming machine in accordance with the present disclosure is able to establish a baseline parameter using a sensor disposed between a forming member and mandrel. Forming parameters for controlling the forming machine during part shaping are developed from the baseline parameter. Optimal forming parameters are determined quickly, accurately, and without highly-trained personnel having to take manual measurements or otherwise directly access the interior of the forming machine. Additionally, features of the setup process facilitate providing machine health feedback for position accuracy and repeatability.

One embodiment is a forming machine that includes a positioning system configured to move a forming member and mandrel relative to one another for forming a shaped part, and a sensor disposed between the forming member and the mandrel. The forming machine also includes a forming controller configured to obtain a first coordinate position of both the forming member and the mandrel in position to produce a target baseline parameter at the sensor, prior to placement of a part over the mandrel. The forming controller is also configured to calculate a second coordinate position of the forming member and the mandrel for forming the part, based on the first coordinate position and a thickness of the part. After placement of the part over the mandrel, the forming controller is configured to direct the positioning system to move the forming member and the mandrel to the second coordinate position to shape the part.

Another aspect of the present disclosure is a method of calibrating a forming machine for forming a shaped part. In one embodiment, the method includes placing a sensor between a forming member and a mandrel of the forming machine, and prior to placing a part over the mandrel, directing a positioning system to move the forming member and the mandrel relative to one another until the sensor detects a target baseline parameter between the forming member and the mandrel. The method also includes obtaining, from the positioning system, a first coordinate position of the forming member and the mandrel in position to produce the target baseline parameter at the sensor. The method further includes calculating a second coordinate position of the forming member and the mandrel for forming the part based on the first coordinate position and a thickness of the part, placing the part over the mandrel, and directing the positioning system to move the forming member and the mandrel to the second coordinate to shape the part.

A further aspect of the present disclosure is a non-transitory computer readable medium. In one embodiment, the non-transitory computer readable medium includes programmed instructions which, when executed by a processor, are operable for performing a method of shaping a part with a forming machine that includes a sensor between a forming member and a mandrel of the forming machine. The method includes obtaining, from a positioning system, a first coordinate position of the forming member and the mandrel in position to produce a target baseline parameter at the sensor. The method also includes calculating a second coordinate position of the forming member and the mandrel for forming the part based on the first coordinate position and a thickness of the part, and directing the positioning system to move the forming member and the mandrel to the second coordinate to shape the part.

Other illustrative embodiments (e.g., of forming machines, methods, and/or computer-readable media relating to the foregoing) are described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2 is a flowchart illustrating an example method of calibrating a forming machine for forming a shaped part, such as a shaped composite part, an in illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure, and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1A:
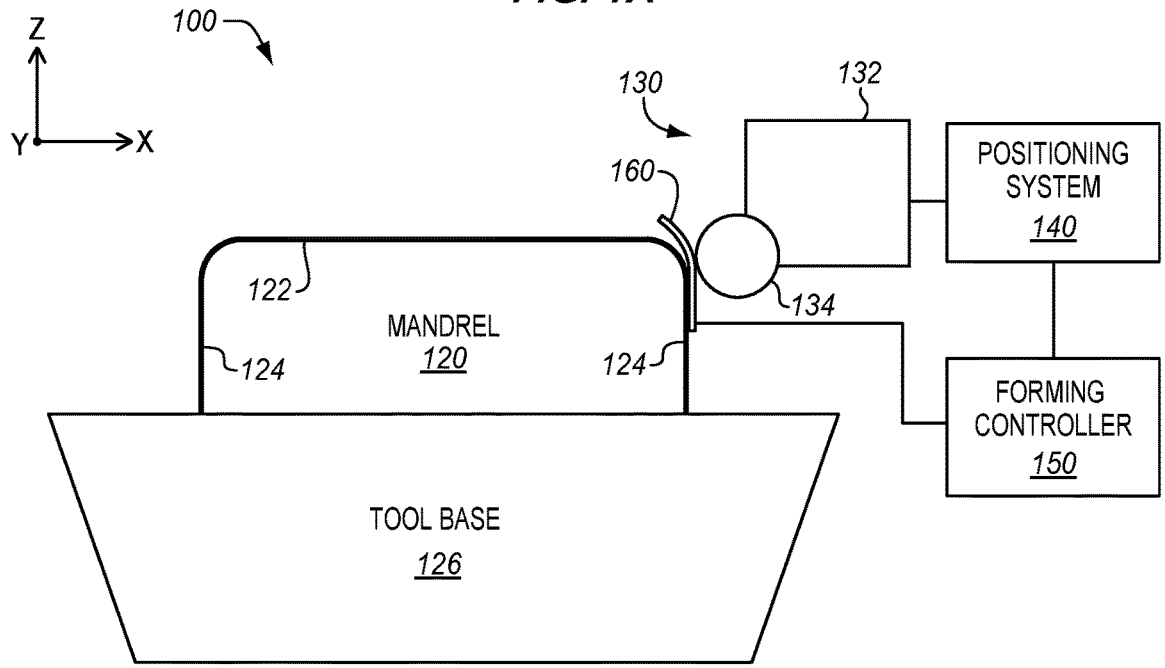
FIG. 1A is a schematic front elevation view of a laminate shear forming machine in an illustrative embodiment.
Figure 1B:
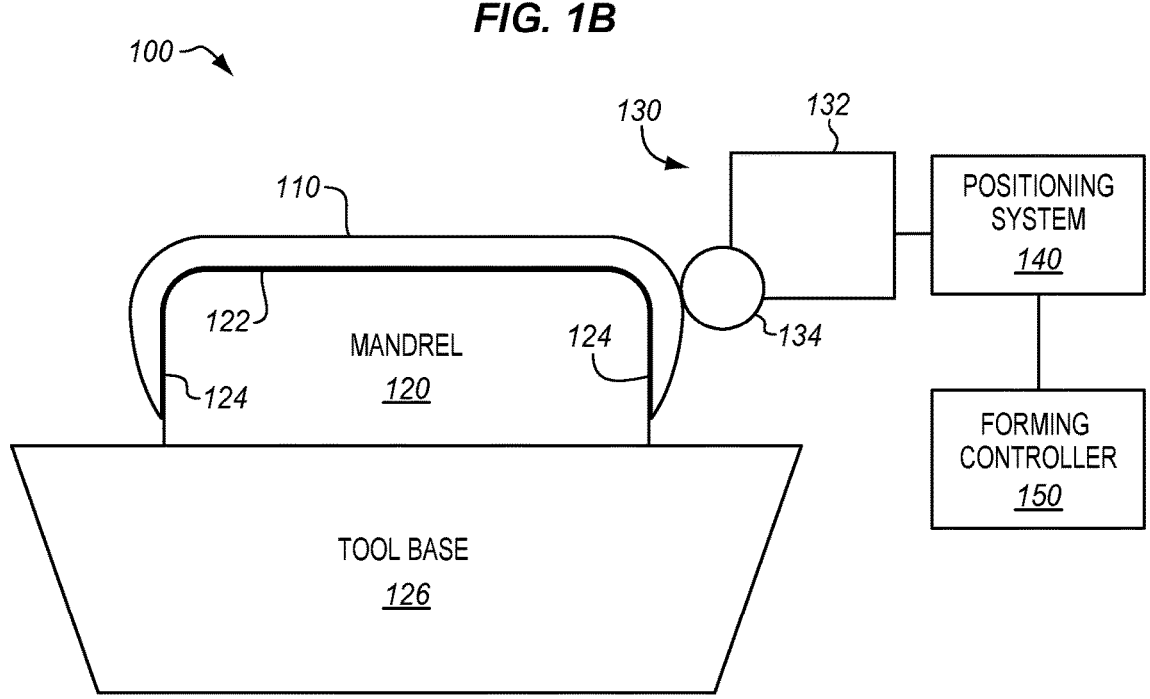
FIG. 1B is a schematic front elevation view of a laminate shear forming machine in another illustrative embodiment.

FIG. 1A is a schematic front elevation view of a laminate shear forming machine 100 in an illustrative embodiment. FIG. 1B is a schematic front elevation view of a laminate shear forming machine 100 in another illustrative embodiment. In particular, FIG. 1B illustrates that the laminate shear forming machine 100 is configured to shape a part 110, such as composite part, using a mandrel 120. That is, the laminate shear forming machine 100 includes one or more forming members 130 configured to press the part 110 against the mandrel 120 to shape the part 110. In this example, the mandrel 120 includes a top surface 122 to support the part 110, and side surfaces 124 that contour from the top surface to provide the surface for shaping the part 110. The mandrel 120 is supported on a tool base 126. The forming member 130 moves to press the part 110 against the mandrel 120 via a positioning system 140.

In one embodiment, each forming member 130 includes a beam 132 and a bladder 134. Although not shown in the front view depicted in FIG. 1B, forming member 130 and mandrel 120 are typically elongate in shape, and often have a similar length, such as to enable the forming member 130 to engage the mandrel 120, or more particularly a part disposed thereon, along its length, as explained in greater detail herein. Bladder 134 is shown in the form of a hose, such as a fire hose, having a circular cross-section when expanded or inflated, and thus is referred to herein as "hose 134," although the bladder may have any suitable configuration. Prior to shaping a part, the hose 134 is inflated, and the mandrel 120 is brought up into the laminate shear forming machine 100 (e.g., in the z-direction via the positioning system 140). Then, to shape the part 110, the positioning system 140 actuates the beam 132 to move toward the mandrel 120, such as toward the side surfaces 124 thereof (e.g., in the x-direction), to press the hose 134 into the part 110 and against the mandrel 120. The laminate shear forming machine 100 may also include heat elements, not shown for simplicity, to apply heat to the composite part 110 to shape and/or harden the material.

To ensure that the part 110 is high quality, the laminate shear forming machine 100 may first undergo a setup process to accurately position the forming member 130 with respect to the mandrel 120. Typically, the setup involves highly-trained personnel climbing into the forming machine to manually establish reference points, measuring offset within the machine using a dial gage, and interpreting results of the dial gage as an inferred degree of forming force. Several forming trials are then performed to establish an acceptable level of forming results. The forming trials are costly for both time and materials, and the dial gage setup process has to be repeated as machine performance adjusts over time.

However, referring in particular to FIG. 1A, the laminate shear forming machine 100 in accordance with the present disclosure is provided with calibrated setup features such as a forming controller 150 and one or more sensors 160. The positioning system 140 drives the forming member 130 and/or the mandrel 120 into an initial position using the sensor 160 as a guide. The positioning system 140 is configured to track the relative position of the forming member 130 and the mandrel 120 with coordinate data, which is any data that describes the position of a marker in a coordinate system. For example, in one example, the coordinate data describes the x, y, z position of the forming member 130 in a Cartesian coordinate system with respect to the mandrel 120. Described another way, in the aforementioned example, the coordinate data describes the x, y, z positions of the forming member 130 and the mandrel 120 (e.g., the relative spatial configuration forming member 130 and mandrel 120) relative to a stationary reference point. The forming controller 150 is configured to determine an optimized forming position of the forming member 130 and the mandrel 120 using the initial position established by the sensor 160. Advantageously, the laminate shear forming machine 100 is able to shape the part 110 accurately and quickly with reduced or eliminated reliance on forming trials and manual procedures performed as part of the typical setup to forming the part 110.

FIG. 2 is a flowchart illustrating an example method 200 of calibrating a forming machine for forming a shaped part, such as a shaped composite part, in an illustrative embodiment. The steps of the method 200 are described with reference to the laminate shear forming machine 100, but those skilled in the art will appreciate that the method 200 may be performed in other types of forming machines. The steps of the flowcharts described herein are not all inclusive, may include other steps not shown, and may also be performed in an alternative order.

In step 202, the sensor 160 is placed between the forming member 130 and the mandrel 120. In step 204, prior to placing a part 110, such as a composite part, over the mandrel 120, the positioning system 140 moves the forming member 130 and the mandrel 120 relative to one another until the sensor 160 detects a target baseline parameter. The positioning system 140 may be operated manually and/or via instructions of the forming controller 150. The target baseline parameter may include a pressure measurement and/or distance measurement. For example, in one embodiment, the sensor 160 includes a pressure sensor configured to detect a target pressure between the forming member 130 and the mandrel 120. In another embodiment, the sensor 160 includes a gap sensor configured to detect a target distance between the forming member 130 and the mandrel 120.

In step 206, a first coordinate position is obtained from the positioning system 140 of the forming member 130 and the mandrel 120 in position to produce the target baseline parameter at the sensor 160. For example, the first coordinate position may include a coordinate value of the forming member 130 as it comes into contact with the mandrel 120 according to the sensor 160. Alternatively, the first coordinate position may represent the position of the forming member 130 with respect to the mandrel 120 that forms a target pressure, such as a prescribed pressure value, at the sensor 160.

In step 208, the forming controller 150 calculates a second coordinate position for positioning the forming member 130 relative to the mandrel 120 for forming the part 110 based on the first coordinate position and a thickness of the part. The thickness of the part may include a pre-formed part thickness or a formed part thickness. For example, the calculation of the second coordinate position may refer to a distance from the first coordinate that is derived from a final part thickness and an interference value that indicates an amount of overlap between the hose 134 and the part 110. The interference value may be a known value to achieve based on historical data and testing. Accordingly, the second coordinate position may describe a position of the forming member 130 and the mandrel 120 that achieves a target parameter while the part 110 is being shaped.

In step 210, the part 110, such as a composite part, is placed over the mandrel 120. And, in step 212, the positioning system 140 is directed to move the forming member 130 and/or the mandrel 120 to the second coordinate position to shape the part 110. Accordingly, method 200 provides a benefit over prior techniques by, prior to placing the part in the forming machine, quickly and accurately determining the position that the forming member 130 and mandrel 120 should be moved to during shaping of the part, without performing a forming trial or using skilled manual procedures.

Figure 3:
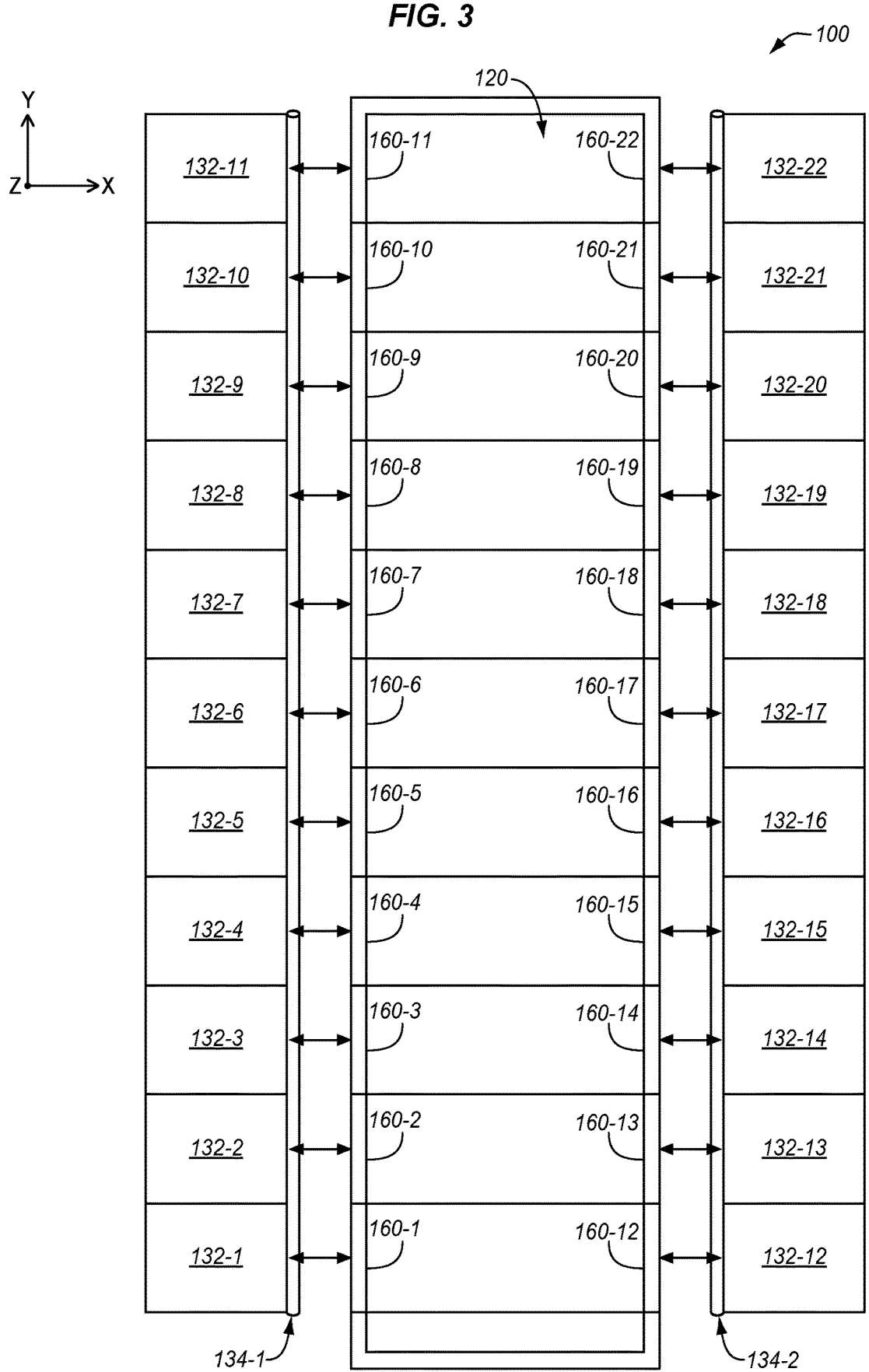
FIG. 3 is a schematic top view of a laminate shear forming machine in an illustrative embodiment.

FIG. 3 is a schematic top view of a laminate shear forming machine 100 in an illustrative embodiment. The laminate shear forming machine 100 includes the mandrel 120 and a plurality of forming members arranged side by side and disposed along a length of the mandrel 120 at either side. In particular, a first series of beams 132-1 through 132-11 and a first hose 134-1 are disposed along a length (e.g., in the y-direction) of a left side of the mandrel 120. Similarly, a second series of beams 132-12 through 132-22 and a second hose 134-2 are disposed along the length of a right side of the mandrel 120. A part 110, such as a composite part (not shown in FIG. 3), may be placed over the mandrel 120 at a time that forming is desired, such that the first series of beams and first hose, and the second series of beams and second hose, run along opposing left and right sides, respectively, of the part.

Once the part is in place, the beams 132 actuate in a lateral direction (e.g., in the x-direction) toward the sides of the mandrel 120 (and the part 110), as indicated by the double arrows in FIG. 3. In some embodiments, the beams 132 may be spaced from one another in the y-direction. For example, adjacent beams 132 may have a gap of approximately 18 inches between beams 132. The hoses 134 may be attached and/or disposed across inwardly facing surfaces of their respective series of beams 132. Accordingly, the first series of beams 132-1 through 132-11 collectively position the first hose 134-1 to shape one side of the part 110, and the second series of beams 132-12 through 132-22 collectively position the second hose 134-2 to shape the other side of the part 110.

Figure 4:
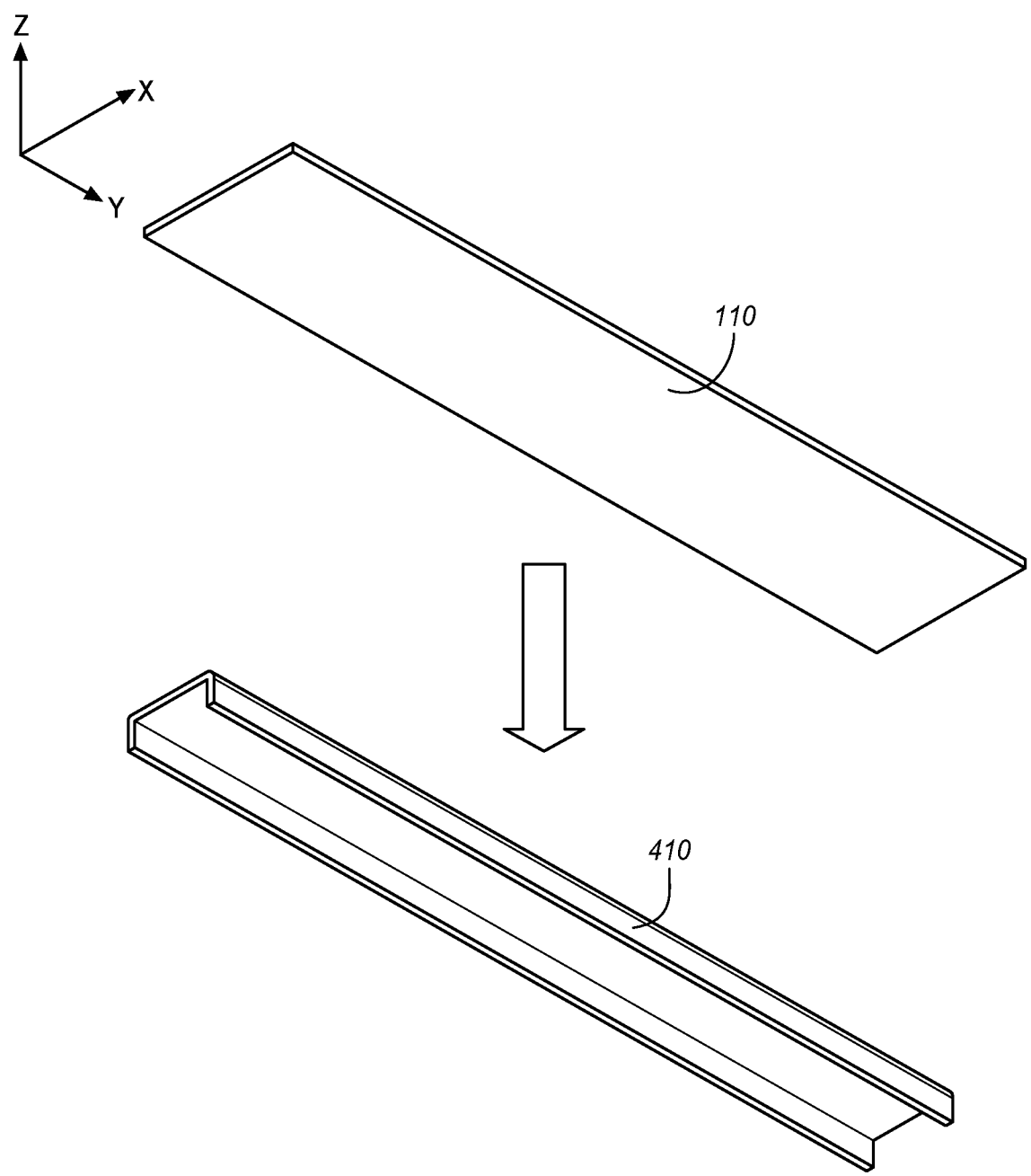
FIG. 4 is a perspective view of a part formed into a shaped part in an illustrative embodiment.

FIG. 4 is a perspective view of the part 110 formed into a shaped part 410 in an illustrative embodiment. In examples in which the part 110 is a composite part, prior to shaping, the part 110 may be laid up as several flat layers or plies of composite material (e.g., carbon fiber reinforced polymer (CFRP)). During shaping, the laminate shear forming machine 100 applies heat and pressure to conform the part 110 to the mandrel 120. After shaping, the part 110 may be cured (e.g., consolidated and/or hardened) into the shaped part 410 (e.g., in an autoclave). In this example, the shaped part 410 is an aircraft spar, though it will be appreciated that the mandrel 120 may include alternative shapes and that the laminate shear forming machine 100 may form alternative composite and other parts.

Returning to FIG. 3, the laminate shear forming machine 100 is shown to include a plurality of sensors 160. In particular, a first series of sensors 160-1-160-11 is disposed along the length of the mandrel 120 at a left side thereof to measure pressure, distance, and/or another target baseline parameter, of corresponding ones of the first series of beams 132-1-132-11 relative to mandrel 120. And, a second series of sensors 160-12 through 160-22 are disposed along the length the mandrel 120 at a right side to measure the target baseline parameter of corresponding ones of the second series of beams 132-12 through 132-22. The sensors 160 may be thus disposed at sections along the mandrel 120 that correspond with sections of the part 110 or with the beams 132.

The beams 132 may be independently controlled to various such positions such that the lateral position of each beam 132 defines a discrete force applied to a corresponding section of length of the mandrel 120 and/or part 110. Although FIG. 3 shows the mandrel 120 and the part 110 having a rectangular shape for simplicity, it will be appreciated that formation of parts having alternative shapes and/or more complex geometries is contemplated, including parts that curve left/right (e.g., in the x-direction) along its length. In some embodiments, the sensors 160 may include pressure sensing strips including a force sensing linear potentiometer with a flexible, thin profile so as not to interrupt the contact force of the forming member 130. Alternatively or additionally, the sensors 160 may include gap sensors that detect a distance between the mandrel 120 and the forming member 130 (e.g., the header surface or the hose 134). The gap sensors may be disposed on the hose 134 in some embodiments.

Figure 5:
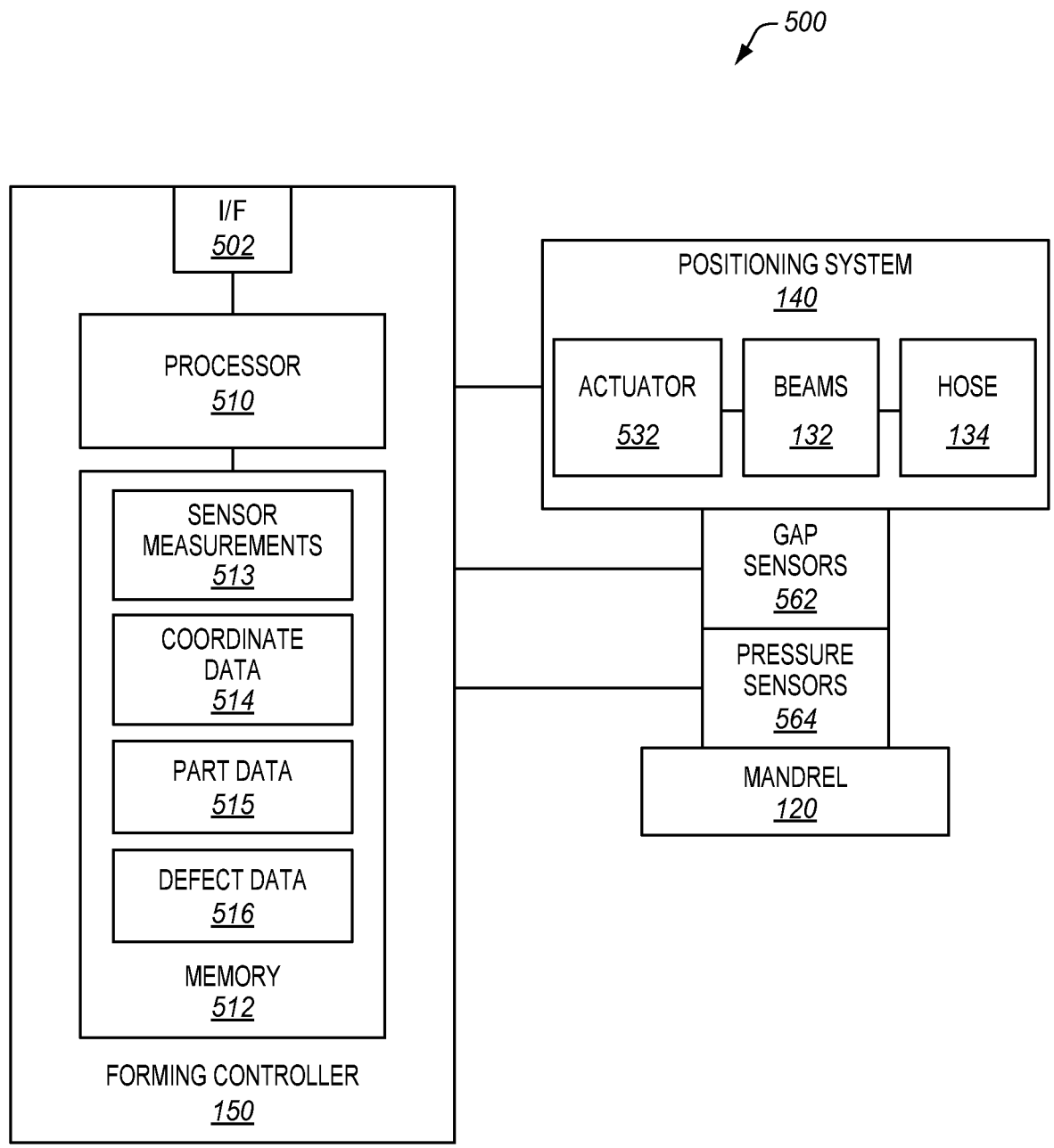
FIG. 5 is a block diagram of a laminate shear forming machine in an illustrative embodiment.

FIG. 5 is a block diagram of a laminate shear forming machine 500 in an illustrative embodiment. The laminate shear forming machine 500 may include gap sensors 562 and/or pressure sensors 564 disposed between components of the positioning system 140 and the mandrel 120. The positioning system 140 includes one or more actuators 532 (e.g., servo motor(s)) to drive and position the beams 132. The forming controller 150 is communicatively coupled with the positioning system 140 to direct the actuator(s) 532 to drive the beams 132 to specific and/or independent locations. The forming controller 150 is also communicatively coupled with the gap sensors 562 and/or pressure sensors 564 to obtain parameter measurements. The forming controller 150 may direct the positioning system 140 to adjust the position of the beams 132 and/or mandrel 120 based on real-time parameter measurements.

The forming controller 150 includes an interface 502, a processor 510, and memory 512. The interface 502 is configured to receive wired or wireless data input for controlling the positioning system 140. In particular, the interface 502 may receive, for storage in memory 512, sensor measurements 513 obtained from the gap sensors 562 and/or pressure sensors 564, coordinate data 514 obtained from the positioning system 140, part data 515, and/or defect data 516. The part data 515 may include, for example, dimensions related to a geometry of the part and/or part thickness. Alternatively or additionally, the part data 515 may include a target pressure or range of pressure values for one or more of the forming members 130 to apply to the part as indicated or input by an operator. For example, a desired pressure value for shaping a part may be correlated with one of the sensors 160 or one of the sections of the part.

The forming controller 150 may be implemented by hardware, software, or some combination thereof. For example, the forming controller 150 may include the processor 510 which includes any electronic circuits and/or optical circuits that are able to perform functions. The processor 510 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The forming controller 150 may also include memory 512, which may include any electronic circuits, optical circuits, and/or magnetic circuits that are able to store data.

Figure 6:
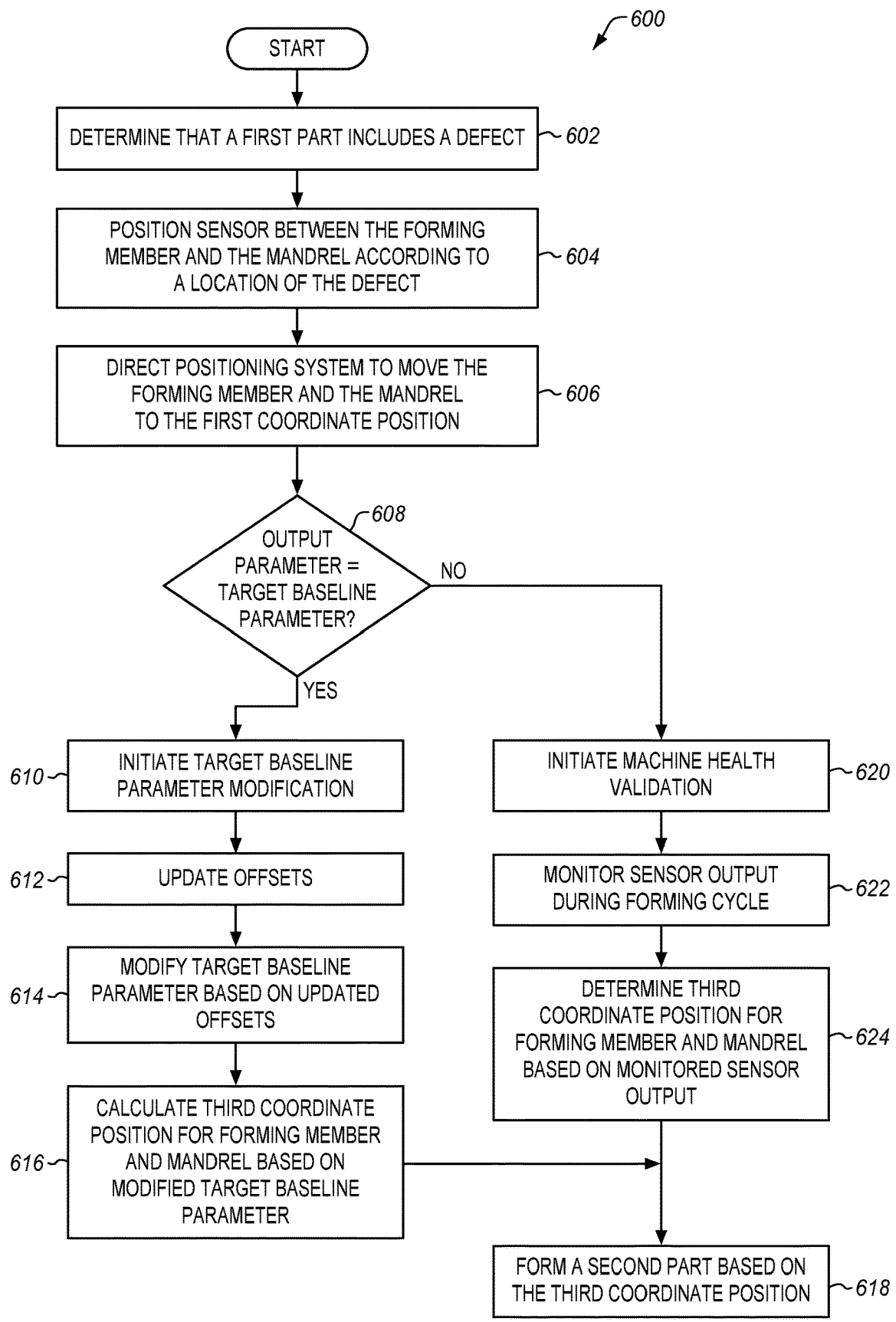
FIG. 6 is a flowchart illustrating an example method of calibrating a forming machine for forming a shaped part, such as a shaped composite part, in another illustrative embodiment.

In a further aspect of this disclosure, a forming machine may be monitored to determine machine health. FIG. 6 is a flowchart illustrating an example method 600 of calibrating a forming machine for forming a shaped part, such as a shaped composite part, in another illustrative embodiment. The steps of the method 600 are described with reference to the laminate shear forming machine 100, but those skilled in the art will appreciate that the method 600 may be performed in other types of forming machines. The steps of the flowcharts described herein are not all inclusive, may include other steps not shown, and may also be performed in an alternative order.

In step 602, a shaped part formed by a forming machine is determined to include a defect. For example, an area of a shaped part may undesirably include a wrinkle in the material where the forming member 130 pressed the part against the mandrel 120, indicating that incorrect parameters were used during part formation. In step 604, a sensor 160 is positioned between the forming member 130 and the mandrel 120 at a location corresponding to the location of the defect of the shaped part. Then, in step 606, the positioning system 140 is directed to move the forming member 130 and the mandrel 120 to the first coordinate position (e.g., obtained in step 206).

In step 608, it is determined whether an output parameter of the sensor 160 matches the target baseline parameter. For example, the forming controller 150 may determine whether the reading of the sensor 160 at step 606 corresponds with the reading previously obtained from the sensor 160 at step 206. If the output parameter matches the target baseline parameter (YES in step 608), the method 600 proceeds to step 610 and target baseline parameter modification is initiated. Otherwise, if the output parameter does not match the target baseline parameter (NO in step 608), the method 600 proceeds to step 620 and machine health validation is initiated.

Initiation of target baseline modification includes, in step 612, updating offsets. And, in step 614, the target baseline parameter is modified based on the updated offsets. An offset may include a characterization of a part that is used to calculate the forming position of the forming member 130 and mandrel 120 to achieve a desired pressure value on a part. An offset may include, for example, a material thickness, spring back (e.g., for forming metal parts), and a defect characterization. Offsets may be stored as part data 515 and/or defect data 516 in memory 512. That is, the forming controller 150, and/or an operator, may determine that, even though the forming machine positioning accuracy is maintained and consistent with initial setup, that the resulting part nonetheless includes an undesirable defect. Accordingly, the operator may be prompted to update one or more offsets, the target baseline parameter, and/or the target forming parameter of a part to correct the defect.

In step 616, the forming controller 150 calculates a third coordinate position for the forming member 130 and mandrel 120 to move to based on the modification of step 614. Then, in step 618, the forming controller 150 directs the positioning system 140 to form a second part based on the third coordinate position. Accordingly, to prevent the defect which occurred on the first shaped part, the position of the forming member 130 and mandrel 120 during part formation is changed to apply a different target forming parameter for the second part that eliminates the defect for subsequent part formation.

Initiation of machine health validation includes, in step 622, monitoring sensor output during a forming cycle. For example, after determining that the first coordinate position of the forming member 130 and mandrel 120 previously determined in setup no longer produces a desired pressure on a part, an operator may be prompted to perform a forming cycle with a test part using pre-installed or temporarily installed sensors. The sensors 160 may provide pressure measurement data to the forming controller 150 as the forming members 130 presses the test part against the mandrel 120. The forming controller 150 may thus validate whether at least one forming member 130 is applying pressure to the part 110 outside an intended pressure value or range for part formation.

In step 624, the forming controller 150 determines a third coordinate position for the forming member 130 and mandrel 120 to move to based on the monitored sensor output during the forming cycle. Using the aforementioned example in which pressure is the target baseline parameter, the forming controller 150 may direct the positioning system 140 to adjust at least one forming member 130 to a position that applies pressure to the part to a target forming pressure value or within a pressure range. For instance, the forming controller 150 may direct the positioning system 140 to move the forming member 130 and mandrel 120 closer until the target pressure value or range is achieved at a third coordinate position.

In step 618, the forming controller 150 directs the positioning system 140 to form a second part based on the third coordinate position. Continuing the aforementioned example, the forming controller 150 may update the coordinate position that results in the target pressure value during part formation. And, the forming controller 150 may use the updated coordinate position for subsequent part formation instead of the previous coordinate position determined during setup. Accordingly, to prevent the defect which occurred on the first shaped part, the position of the forming member 130 and mandrel 120 during part formation is changed to apply a different target forming parameter for the second part that eliminates the defect for subsequent part formation.

Figure 7:
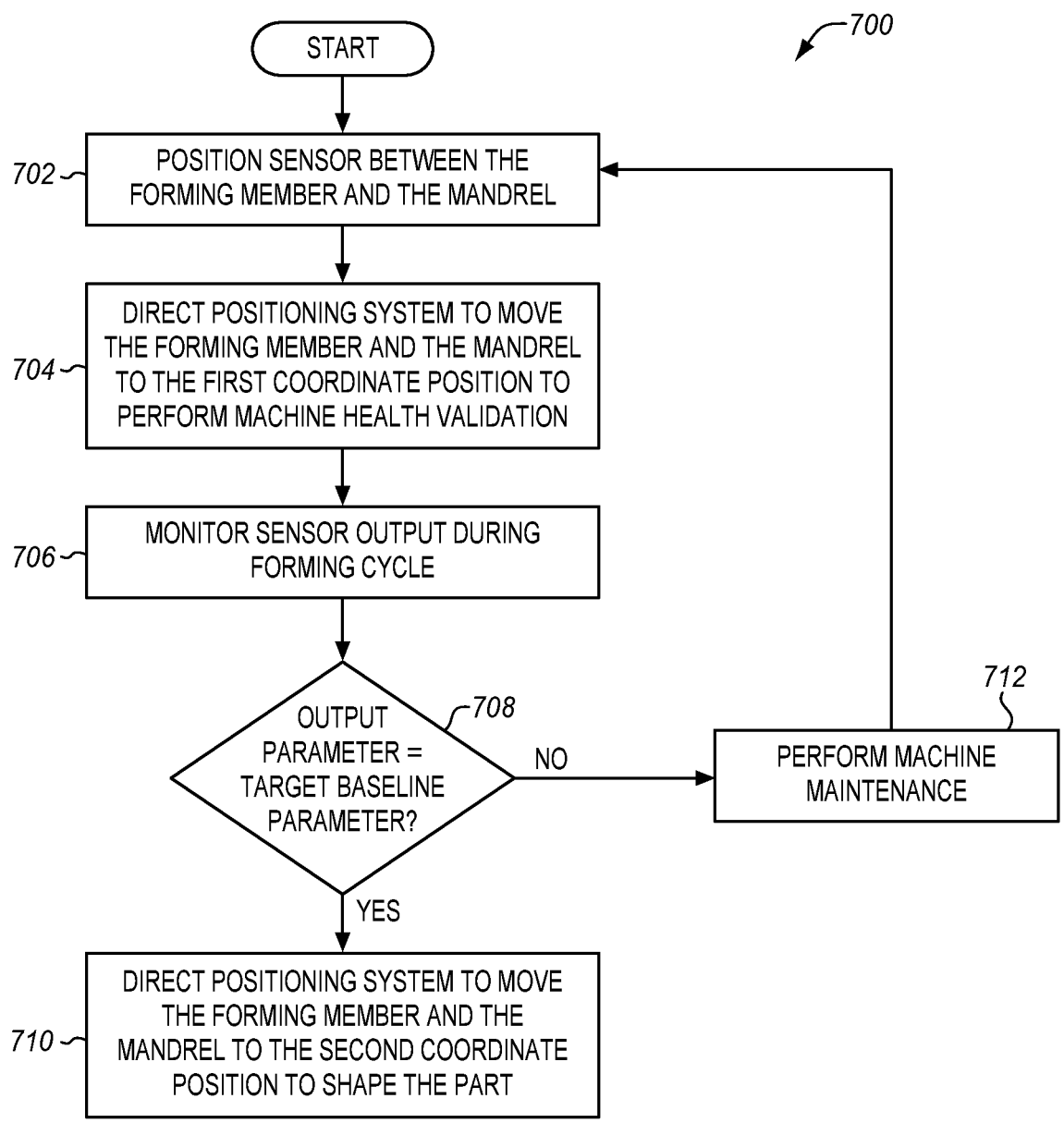
FIG. 7 is a flowchart illustrating an example method of calibrating a forming machine for forming a shaped part, such as a shaped composite part, in yet another illustrative embodiment.

FIG. 7 is a flowchart illustrating an example method 700 of calibrating a forming machine for forming a shaped part, such as a shaped composite part, in yet another illustrative embodiment. The steps of the method 700 are described with reference to the laminate shear forming machine 100, but those skilled in the art will appreciate that the method 700 may be performed in other types of forming machines. The steps of the flowcharts described herein are not all inclusive, may include other steps not shown, and may also be performed in an alternative order.

In step 702, the sensor 160 is positioned between the forming member 130 and mandrel 120. In step 704, the positioning system 140 is directed to move the forming member 130 and mandrel 120 to the first coordinate position to perform machine health validation. For example, the forming machine may be configured to periodically validate its performance against baseline parameters established during setup. Alternatively, machine health validation may be performed in response to detecting a part defect or operator input.

In step 706, sensor output is monitored during a forming cycle of a part. In step 708, it is determined whether an output parameter of the sensor 160 matches the target baseline parameter. If the output parameter matches the target baseline parameter (YES in step 708), the method 700 proceeds to step 710 and the positioning system 140 is directed to move the forming member 130 and mandrel 120 to the second coordinate position to shape the part. In other words, the machine health is validated and may continue formation of parts using the same positioning settings.

Otherwise, if the output parameter does not match the target baseline parameter (NO in step 708), the method 700 proceeds to step 712 to perform machine maintenance. That is, a discrepancy from the output parameter from the target baseline parameter determined during setup may indicate a component degradation of the forming machine over time. In one example, the forming controller 150 generates a message indicating that at least one of the forming members 130 is applying a pressure value outside a threshold of the target pressure value and/or that one or more components (e.g., the hose 134 or spring which drives the actuator 532) are to be checked. Steps of method 700 may repeat as necessary to validate machine health. Accordingly, method 700 provides a technical benefit over prior systems because it enables validation of machine health, to ensure shaping of parts is consistent over time.

Figure 8:
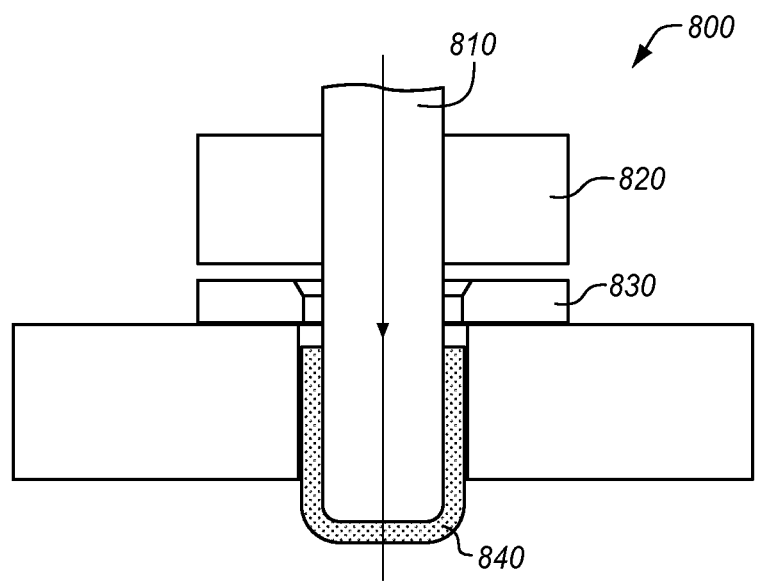
FIG. 8 is a schematic front elevation view of a deep draw forming machine in an illustrative embodiment.

FIG. 8 is a schematic front elevation view of a deep draw forming machine 800 in an illustrative embodiment. The deep draw forming machine 800 includes a punch 810, retainer 820, and a die 830. Initially, a blank, such as a metal blank, is clamped between the retainer 820 and die 830. The metal blank is progressively punched down into the die 830 by the punch 810 to form a shaped part 840. Embodiments herein may thus apply to a deep draw forming machine 800 in which the punch 810 corresponds with a forming member and the retainer 820 corresponds with a mandrel. In accordance with the principles and concepts discussed above, in such embodiments, a sensor (not shown) may be disposed between the punch 810 and the retainer 820 to provide feedback for monitoring and/or adjusting the relative movement of the punch 810 for accurate shaping with the deep draw forming machine 800 without manually measuring distances or producing test parts.

Figure 9:
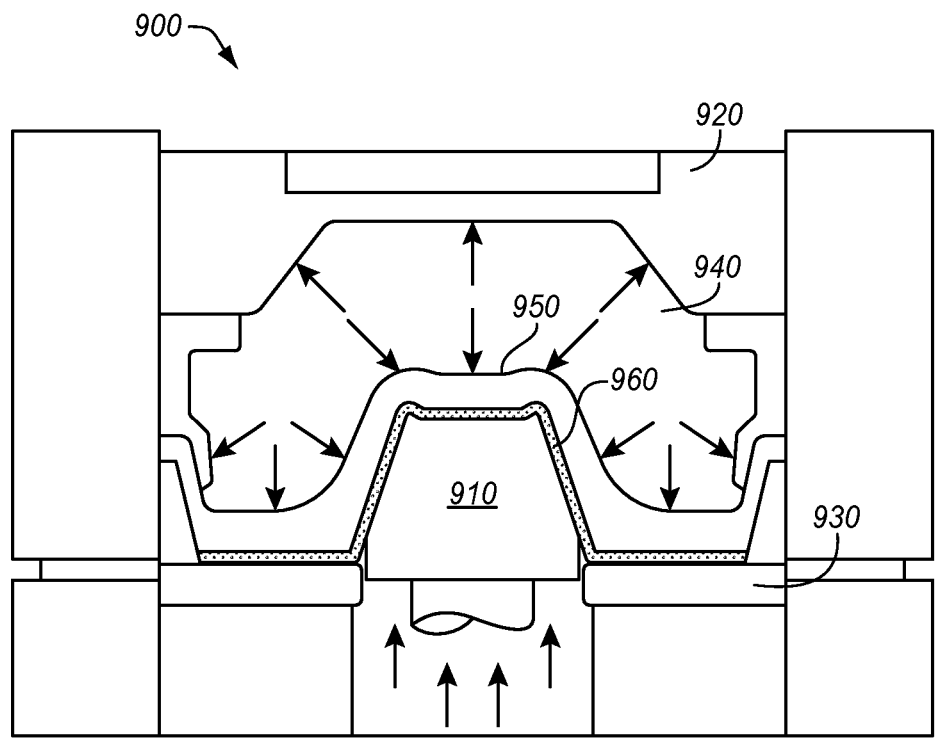
FIG. 9 is a schematic front elevation view of a hydroforming machine in an illustrative embodiment.

FIG. 9 is a schematic front elevation view of a hydroforming machine 900 in an illustrative embodiment. The hydroforming machine 900 includes a punch 910, a die 920, a retainer 930, a fluid cavity 940, and a bladder 950. A blank, such as a metal blank, is positioned between the retainer 930 and the bladder 950. The punch 910 presses the metal blank from one side, and the bladder 950 presses the other side, via the pressure inside the fluid cavity 940 to shape the metal blank into a metal part 960. Embodiments herein may thus apply to a hydroforming machine 900 in which the punch 910 corresponds with a forming member and the bladder 950 corresponds with a mandrel. In accordance with the principles and concepts discussed above, in such embodiments, a sensor (not shown) may be disposed between the punch 910 and the bladder 950 to provide feedback for monitoring and/or adjusting the relative movement of the punch 910 for accurate shaping with the hydroforming machine 900 without manually measuring distances or producing test parts. Thus, it can be understood that embodiments herein may therefore apply to a variety of forming machines and a variety of part shapes and materials including composite materials and/or metals (including, for example, stainless steel, titanium, brass, aluminum, and so forth).

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:
1. A forming machine comprising:
a positioning system configured to move a forming member and mandrel of the forming machine relative to one another for forming a shaped part;
a sensor, disposed between the forming member and the mandrel, configured to detect a target baseline parameter between the forming member and the mandrel; and
a forming controller configured to obtain a first coordinate position of the forming member and the mandrel in position to produce the target baseline parameter at the sensor prior to placement of a part over the mandrel, to calculate a second coordinate position of the forming member and the mandrel for forming the part based on the first coordinate position and a thickness of the part, and, after placement of the part over the mandrel, to direct the positioning system to move the forming member and the mandrel to the second coordinate position to shape the part.
2. The forming machine of claim 1 wherein:
the sensor includes a pressure sensor, and
the forming controller is configured to obtain the first coordinate position of the forming member and the mandrel in position to produce a target pressure between the forming member and the mandrel at the pressure sensor.

3. The forming machine of claim 1 wherein:
the sensor includes a gap sensor, and
the forming controller is configured to obtain the first coordinate position of the forming member and the mandrel in position to produce a target distance between the forming member and the mandrel at the gap sensor.

4. The forming machine of claim 1 wherein:
the forming controller is configured to direct the positioning system to move the forming member and the mandrel to the first coordinate position to monitor an output parameter of the sensor at a defect location, and, in response to determining that the output parameter of the sensor matches the target baseline parameter, to modify the target baseline parameter based on an update to the thickness of the part.

5. The forming machine of claim 1 wherein:
the forming controller is configured to direct the positioning system to move the forming member and the mandrel to the first coordinate position to perform machine health validation.

6. The forming machine of claim 1 wherein:
the mandrel includes a top surface to support a composite part and side surfaces that contour from the top surface to provide the surface for shaping the composite part,
the forming machine includes a plurality of forming members comprising beams arranged side by side along a length of the mandrel and configured to actuate individually toward the side surfaces of the mandrel, and a hose attached to the beams and disposed along the length of the mandrel, and
the forming members are configured to press the composite part against the side surfaces of the mandrel to shape the composite part.

7. The forming machine of claim 1 wherein:
the mandrel includes a die having a surface for shaping a metal blank into a metal part, and
the forming member includes a punch to press the metal blank into the die to form the metal part.

8. A method of calibrating a forming machine for forming a shaped part, the method comprising:
placing a sensor between a forming member and a mandrel of the forming machine;
prior to placing a part over the mandrel, directing a positioning system to move the forming member and the mandrel relative to one another until the sensor detects a target baseline parameter between the forming member and the mandrel;
obtaining, from the positioning system, a first coordinate position of the forming member and the mandrel in position to produce the target baseline parameter at the sensor;
calculating a second coordinate position of the forming member and the mandrel for forming the part based on the first coordinate position and a thickness of the part;
placing the part over the mandrel; and
directing the positioning system to move the forming member and the mandrel to the second coordinate to shape the part.

9. The method of claim 8 further comprising:
placing a pressure sensor between the forming member and the mandrel;
directing the positioning system to move the forming member and the mandrel relative to one another until the pressure sensor detects a target pressure between the forming member and the mandrel; and
obtaining, from the positioning system, the first coordinate position of the forming member and the mandrel in position to produce the target pressure on the pressure sensor.

10. The method of claim 8 further comprising:
placing a gap sensor between the forming member and the mandrel of the forming machine;
directing the positioning system to move the forming member and the mandrel relative to one another until the gap sensor detects a target distance between the forming member and the mandrel; and
obtaining, from the positioning system, the first coordinate position of the forming member and the mandrel in position to produce the target distance at the gap sensor.

11. The method of claim 8 further comprising:
directing the positioning system to move the forming member and the mandrel to the first coordinate position to monitor an output parameter of the sensor at a defect location; and
in response to determining that the output parameter of the sensor matches the target baseline parameter, modifying the target baseline parameter based on an update to the thickness of the part.

12. The method of claim 8 further comprising:
directing the positioning system to move the forming member and the mandrel to the first coordinate position to perform machine health validation.

13. The method of claim 12 further comprising:
monitoring sensor output during a forming cycle; and
in response to determining that the sensor output during the forming cycle does not match the target baseline parameter, initiating a machine maintenance operation.

14. The method of claim 13 further comprising:
calculating a third coordinate position of the forming member and the mandrel for part shaping based on the sensor output during the forming cycle.

15. A non-transitory computer readable medium embodying programmed instructions which, when executed by a processor, are operable for performing a method of shaping a part with a forming machine including a sensor between a forming member and a mandrel of the forming machine, the method comprising:
obtaining, from a positioning system, a first coordinate position of the forming member and the mandrel in position to produce a target baseline parameter at the sensor;
calculating a second coordinate position of the forming member and the mandrel for forming the part based on the first coordinate position and a thickness of the part; and
directing the positioning system to move the forming member and the mandrel to the second coordinate to shape the part.

16. The medium of claim 15 wherein the sensor includes a pressure sensor the method further comprises:
directing the positioning system to move the forming member and the mandrel relative to one another until the pressure sensor detects a target pressure between the forming member and the mandrel; and
obtaining, from the positioning system, the first coordinate position of the forming member and the mandrel in position to produce the target pressure on the pressure sensor.

17. The medium of claim 15 wherein the sensor includes a gap sensor and the method further comprises:
  directing the positioning system to move the forming member and the mandrel relative to one another until the gap sensor detects a target distance between the forming member and the mandrel; and
  obtaining, from the positioning system, the first coordinate position of the forming member and the mandrel in position to produce the target distance at the gap sensor.

18. The medium of claim 15 wherein the method further comprises:
  directing the positioning system to move the forming member and the mandrel to the first coordinate position to monitor an output parameter of the sensor at a defect location; and
  in response to determining that the output parameter of the sensor matches the target baseline parameter, modifying the target baseline parameter based on an update to the thickness of the part.

19. The medium of claim 15 wherein the method further comprises:
  directing the positioning system to move the forming member and the mandrel to the first coordinate position to perform machine health validation.

20. The medium of claim 19 wherein the method further comprises:
  monitoring sensor output during a forming cycle; and
  in response to determining that the sensor output during the forming cycle does not match the target baseline parameter, initiating a machine maintenance operation.

21. The forming machine of claim 1 wherein:
  the first coordinate position includes a coordinate value of the forming member as the forming mandrel comes into contact with the mandrel.

22. The method of claim 8 wherein:
  the first coordinate position includes a coordinate value of the forming member as the forming mandrel comes into contact with the mandrel.

23. The medium of claim 15 wherein:
  the first coordinate position includes a coordinate value of the forming member as the forming mandrel comes into contact with the mandrel.

\* \* \* \* \*